United States Patent
Pirri et al.

(10) Patent No.: US 10,392,491 B2
(45) Date of Patent: Aug. 27, 2019

(54) HALOGENATED POLYMER COMPOSITE COMPOSITION, ITS MANUFACTURING PROCESS AND ITS USE

(71) Applicant: Arkema France, Colombes (FR)

(72) Inventors: Rosangela Pirri, Montardon (FR); Philippe Hajji, Chatillon d'Azergues (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 14/762,489

(22) PCT Filed: Jan. 24, 2014

(86) PCT No.: PCT/EP2014/051443
§ 371 (c)(1),
(2) Date: Jul. 22, 2015

(87) PCT Pub. No.: WO2014/114769
PCT Pub. Date: Jul. 31, 2014

(65) Prior Publication Data
US 2016/0002434 A1   Jan. 7, 2016

(30) Foreign Application Priority Data
Jan. 24, 2013 (FR) ..................................... 13 50623

(51) Int. Cl.
*C08K 3/26* (2006.01)
*C08J 3/12* (2006.01)
(Continued)

(52) U.S. Cl.
CPC .................. *C08K 3/26* (2013.01); *C08J 3/12* (2013.01); *C08J 3/122* (2013.01); *C08J 3/124* (2013.01);
(Continued)

(58) Field of Classification Search
CPC .. C08K 3/0033; C08K 3/26; C08K 2003/265; C08K 3/013; C08J 2327/04;
(Continued)

(56) References Cited

U.S. PATENT DOCUMENTS 2,713,563 A * 7/1955 Kuhn .................. C08K 3/0033
523/342
4,716,062 A   12/1987 Klein
(Continued)

FOREIGN PATENT DOCUMENTS

DE         19725890 A1   6/1997
EP       1 586 602 A1   10/2005
(Continued)

*Primary Examiner* — Camie S Thompson
(74) *Attorney, Agent, or Firm* — Lynn B. Morreale

(57) ABSTRACT

The present invention relates to a halogenated polymer composite composition that encapsulates a mineral filler. In particular the present invention relates to a polymer composite composition comprising at least one halogen containing polymer and at least one mineral filler, characterized that the halogen containing polymer and the mineral filler are both in form of a dispersion in aqueous phase during the mixing of the halogen containing polymer and the mineral filler. More particularly the present invention relates to a manufacturing method for a polymer composite composition comprising the steps of mixing of at least one halogen containing polymer with at least one mineral filler and drying the mixture of previous step wherein the halogen containing polymer and the mineral filler in step are in form of a dispersion in aqueous phase.

2 Claims, 1 Drawing Sheet

Figure 1:
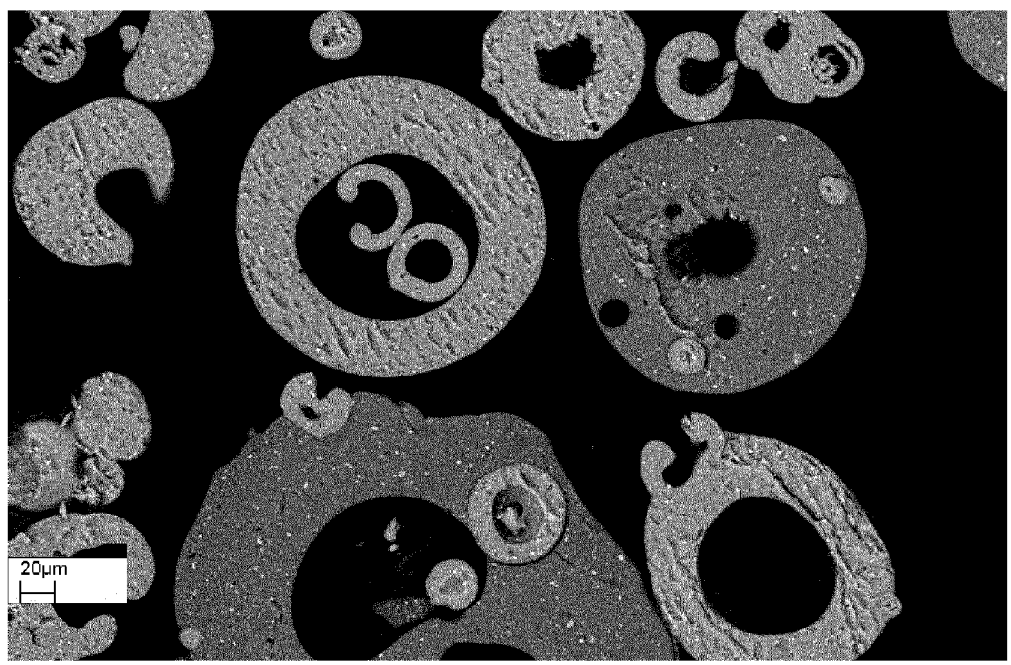

(51) Int. Cl.
*C08J 3/215* (2006.01)
*C08K 3/013* (2018.01)
*C08J 3/16* (2006.01)
*C08J 3/22* (2006.01)

(52) U.S. Cl.
CPC ............. *C08J 3/16* (2013.01); *C08J 3/215* (2013.01); *C08J 3/226* (2013.01); *C08K 3/013* (2018.01); *C08J 2327/04* (2013.01); *C08J 2327/06* (2013.01); *C08J 2427/04* (2013.01); *C08J 2427/06* (2013.01); *C08K 2003/265* (2013.01)

(58) Field of Classification Search
CPC ........... C08J 2327/06; C08J 2427/04; C08J 2427/06; C08J 3/12; C08J 3/122; C08J 3/124; C08J 3/16; C08J 3/215; C08J 3/226; C08L 27/06
USPC ..................................................... 524/425
See application file for complete search history.

(56) References Cited

U.S. PATENT DOCUMENTS

| | | |
|---|---|---|
| 5,412,019 A | 5/1995 | Roulstone et al. |
| 5,534,585 A | 7/1996 | Roulstorie et al. |
| 2002/0121064 A1 | 9/2002 | Erwin |
| 2007/0021551 A1 | 1/2007 | Malvasi et al. |
| 2007/0027243 A1* | 2/2007 | Wegmann ............. C08K 5/005 524/302 |
| 2007/0149684 A1 | 6/2007 | Vandevyver et al. |
| 2009/0018248 A1* | 1/2009 | Pirri ........................ C08K 9/08 524/425 |
| 2009/0156722 A1 | 6/2009 | Khanna et al. |
| 2011/0136953 A1* | 6/2011 | Thetford ................. C08J 3/203 524/310 |
| 2011/0305862 A1 | 12/2011 | Rachwal |
| 2012/0186636 A1 | 7/2012 | Bonnet et al. |
| 2013/0053498 A1 | 2/2013 | Bonnet et al. |
| 2013/0293195 A1 | 11/2013 | Ishii |
| 2013/0345348 A1 | 12/2013 | Bibette et al. |

FOREIGN PATENT DOCUMENTS

| | | |
|---|---|---|
| EP | 1 985 662 A1 | 10/2008 |
| GB | 978 583 | 12/1964 |
| GB | 1 134 436 | 11/1968 |
| GB | 1 564 087 | 4/1980 |
| GB | 2 297 974 A1 | 8/1996 |
| HU | 9904582 A | 12/1999 |
| JP | 2004352812 A2 | 12/2004 |
| WO | WO 2012/067937 A2 | 5/2012 |

* cited by examiner

HALOGENATED POLYMER COMPOSITE COMPOSITION, ITS MANUFACTURING PROCESS AND ITS USE

CROSS-REFERENCE TO RELATED APPLICATIONS

This application is a national stage application under 35 U.S.C. § 371 of PCT/EP2014/051443, filed Jan. 24, 2014, which claims benefit to French patent application FR 13/50623, filed Jan. 24, 2013.

FIELD OF THE INVENTION

The present invention relates to a halogenated polymer composite composition that encapsulates a mineral filler.

In particular the present invention relates to a polymer composite composition comprising at least one halogen containing polymer and at least one mineral filler, characterized that the halogen containing polymer and the mineral filler are both in form of a dispersion in aqueous phase during the mixing of the halogen containing polymer and the mineral filler.

More particularly the present invention relates to a manufacturing method for a polymer composite composition comprising the steps of mixing of at least one halogen containing polymer with at least one mineral filler and drying the mixture of previous step wherein the halogen containing polymer and the mineral filler in the mixing step are in form of a dispersion in aqueous phase.

Technical Problem

Polymer products, such as filled polymer products, have become increasingly useful in a variety of applications, including household, electrical, construction, and office equipment products. Examples of such products include adhesives, caulks, sealants, rubbers, plastics, and vinyl sidings. Such polymer products typically comprise an organic or petroleum based resin. Filled polymer products can further comprise an inorganic particulate mineral filler.

These mineral fillers are widely used as filler additives in plastic compounds. This is due to technical or economical reasons.

However mineral powders can cause many problems for example in conveying systems. This is due to fillers particle shape, size (aspect ratio) and particle size distribution (fine particle content) as well as the particle's roughness, hardness (abrasiveness), and density of the mineral filler.

The manipulation and handling of these mineral filler powders have disadvantages due to the fine particles content in view of security and health aspect.

The handling of powders of mineral fillers is also difficult in view of bad flow ability of the powders.

Additionally due to the density difference it is difficult to disperse these mineral fillers in a homogenous way inside the polymer. The introduction of the mineral filler usually takes place during a mixing step of the powder of the mineral filler with the polymer, which can be in form of a powder as well or in form of granules.

If the polymer is in form of a powder consisting of polymer particles such mineral filler introduction does not protect from certain drawbacks as dispersion and concentration heterogeneities as well as segregation issues. Also the conveying or pneumatic transport is more difficult, for instance between mixing stations and extrusion lines. This is more particularly true when the amount of mineral filler content is above 10 wt % with respect to the polymer content.

An extruded piece or injection molded article would have also these heterogeneous distributions of the mineral particulate filler, which would influence negatively its performance and would certainly increase the scrap rate of the production unit.

The object of the present invention is to improve dispersion and concentration homogeneities and prevent segregation (specially during transportation or transfer) for and during the manufacturing of a polymer composite comprising a mineral filler.

An objective of the present invention is also to have an efficient and homogenous distribution of the mineral filler in a polymer composite composition, to encapsulate the mineral fill in the polymer matrix.

Another objective of the present invention is to avoid segregation between polymer powder and the mineral filler.

Still another objective of the present invention is a method for manufacturing a polymer composite composition comprising a halogen containing polymer and a mineral filler with a homogenous distribution of the mineral filler Still another objective of the present invention is a method for manufacturing a polymer composite composition in form of a free flowing dry powder comprising a halogen containing polymer and a mineral filler with a homogenous distribution of the mineral filler.

BACKGROUND OF THE INVENTION

Prior Art

The document WO2007/075425 describes PVC compositions. These PVC compositions comprise mineral fillers that are blended with the PVC resin in an extruder.

The document WO2012/099160 describes composite polymer modifiers, especially for PVC. The modifiers are dry blended with the resin.

The document EP1985662 describes a thermally stabilized PVC composition comprising CaCO3 nanoparticles. The compositions are prepared by melt compounding or by dissolving the PVC in an organic solvent followed by adding a organic solvent containing CaCO3 nanoparticles. These procedures imply either the use of an organic solvent or handling of the nanoparticles during the compounding step.

The document EP186602 discloses the production of mineral fillers in surface-treated, encapsulated, masterbatch or composite blend form involves mixing an aqueous suspension of a mineral compound with an aqueous polymer emulsion and drying the mixture with ultra-high frequency (UHF) radiation. The polymer emulsion is an elastomeric polymer and the objective is to modify the surface of the mineral fillers in order to ease their incorporation. UHF is used as drying methods instead of any other for avoiding thermal degradation of the polymer.

The document WO2012/085135 discloses a process for preparing a masterbatch in the liquid phase with a diene elastomer latex and an aqueous dispersion of a filler. The product is recovered by coagulation and is not in form of a powder.

BRIEF DESCRIPTION OF THE INVENTION

Surprisingly it has been found that a polymer composite composition comprising at least one halogen containing polymer and at least one mineral filler solves the above mentioned problems when the halogen containing polymer and the mineral filler are both in form of a dispersion in aqueous phase during the mixing of the halogen containing polymer and the mineral filler.

Surprisingly it has also been found that an efficient distribution of the mineral filler can be obtained by a method for manufacturing a polymer composite composition comprising the steps of a) mixing of at least one halogen containing polymer with at least one mineral filler, and b) drying the obtained mixture of step a) wherein the halogen containing polymer and the mineral filler in step a) are in form of a dispersion in aqueous phase.

Surprisingly it has also been found that an efficient distribution of the mineral filler can be obtained by a method for manufacturing a polymer composite composition comprising the steps of a) mixing of at least one halogen containing polymer with at least one mineral filler, b) recovering the mixture obtained in a) and c) drying the recovered mixture of step b) wherein the halogen containing polymer and the mineral filler in step a) are in form of a dispersion in aqueous phase.

DETAILED DESCRIPTION OF THE INVENTION

According to a first aspect, the present invention relates to a polymer composite composition comprising
  at least one halogen containing polymer
  at least one mineral filler,
characterized that the halogen containing polymer and the mineral filler are both in form of a dispersion in aqueous phase during the mixing of the halogen containing polymer and the mineral filler.

According to a second aspect, the present invention relates to a polymer composite composition comprising
  at least one halogen containing polymer
  at least one mineral filler,
characterized that the halogen containing polymer and the mineral filler are both in form of a dispersion in aqueous phase during the mixing of the halogen containing polymer and the mineral filler and that the halogen containing polymer was synthesised by suspension polymerization, microsuspension polymerization or emulsion polymerization in aqueous phase.

In a third aspect the present invention relates to a method for manufacturing a polymer composite composition comprising the steps of
  a) mixing of at least one halogen containing polymer with at least one mineral filler
  b) drying the obtained mixture of previous step
wherein the halogen containing polymer and the mineral filler in step a) are in form of a dispersion in aqueous phase.

In a fourth aspect the present invention relates to a method for manufacturing a polymer composite composition comprising the steps of
  a) mixing of at least one halogen containing polymer with at least one mineral filler
  b) recovering of the mixture obtained in a)
  c) drying the recovered mixture of step b)
wherein the halogen containing polymer and the mineral filler in step a) are in form of a dispersion in aqueous phase.

In a further aspect the present invention relates to a method for manufacturing a polymer composite composition comprising the steps of
  a) mixing of at least one halogen containing polymer with at least one mineral filler
  b) recovering of the mixture obtained in a)
  c) drying the recovered mixture of step b)
wherein the halogen containing polymer and the mineral filler in step a) are in form of a dispersion in aqueous phase and that the halogen containing polymer was synthesised by suspension polymerization, micro-suspension polymerization or emulsion polymerization in aqueous phase.

In still an additional aspect the present invention relates to a method for manufacturing a polymer composite composition comprising the steps of
  a) mixing of at least one halogen containing polymer with at least one mineral filler
  b) recovering of the mixture obtained in a)
  c) drying the recovered mixture of step b)
wherein the halogen containing polymer and the mineral filler in step a) are in form of a dispersion in aqueous phase and the recovering step is made by spray drying.

By the term "polymer composite" as used is denoted a multicomponent material comprising multiple different phase domains in which at least one type of phase domain is a continuous phase and in which at least one component is a polymer.

By the term "PVC" as used is understood polyvinyl chloride in form of homopolymer or copolymer comprising at least 50 wt % of vinyl chloride.

By the term "dispersion" as used is denoted a colloidal system with a continuous liquid phase and a discontinuous solid phase that is distributed throughout the continuous phase.

By the term "emulsion" as used is denoted a liquid/liquid mixture of a liquid discontinuous phase in a liquid continuous phase.

By the term "suspension" as used is denoted a dispersion with continuous aqueous phase and a discontinuous solid phase in form of particles that have a number average diameter of 5 to 300 µm.

By the term "microsuspension" as used is denoted a dispersion in form of a continuous aqueous phase and discontinuous solid polymer particles in an aqueous continuous phase with a number average particle size less then 10 µm.

By the term "latex" as used is denoted a dispersion in form of a continuous aqueous phase and solid polymer particles in an aqueous continuous phase with a number average particle size less than 3 µm.

By the term "slurry" as used in the present invention is denoted an aqueous dispersion of the mineral filler.

By the term "thermoplastic polymer" as used is denoted a polymer that turns to a liquid or becomes more liquid or less viscous when heated and that can take on new shapes by the application of heat (thermoforming) and pressure. After cooling down the polymer becomes hard again and keeps the shape formed into.

With regard to the halogen containing polymer, mention may be made of:
  homopolymers and copolymers of vinyl chloride (PVC) and of vinylidene chloride (PVDC), vinyl resins comprising vinyl chloride units in their structure, such as copolymers of vinyl chloride, and vinyl esters of aliphatic acids, especially vinyl acetate, copolymers of vinyl chloride with esters of acrylic and methacrylic acid and with acrylonitrile, copolymers of vinyl chloride with diene compounds and unsaturated dicarboxylic acids or their anhydrides, such as copolymers of vinyl chloride with diethyl maleate, diethyl fumarate or maleic anhydride, post-chlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and its copolymers with vinyl chloride and other polymerizable compounds;

polymers of vinyl chloroacetate and dichlorodivinyl ether; chlorinated polymers of vinyl carboxylate, such as vinyl acetate, vinyl propionate, vinyl butyrate, chlorinated polymeric esters of acrylic acid and of α-substituted acrylic acid, such as methacrylic acid, of nitriles, amides, alkyl esters such as acrylonitrile, (meth)acrylamide, methyl (meth)acrylate, butyl acrylate, ethyl acrylate, 2-ethylhexyl acrylate;

polymers of vinyl aromatic derivatives, such as styrene, dichlorostyrene; chlorinated rubbers;

chlorinated polymers of olefins, such as ethylene, propene, 1-butene, (2.2.1)bicyclo heptene-2, (2.2.1)bicyclo hepta-diene-2,5;

polymers and post-chlorinated polymers of chlorobutadiene and copolymers thereof with vinyl chloride, chlorinated natural and synthetic rubbers, and also mixtures of these polymers with one another or with other polymerizable compounds.

grafted halogen containing copolymers, where the halogen containing polymer part is grafted on an (meth) acrylic homo or copolymer, in form of a particles, which could be crosslinked or not.

Preferably the halogen containing polymer is a thermoplastic polymer and not an elastomeric polymer. The glass transition temperature (measured by differential scanning calorimetry) of the thermoplastic polymer is at least 40° C., preferably 50° C.

Preferably the halogen in the halogen containing polymer is chosen from fluorine or chlorine and advantageously the halogen is chlorine.

The chlorine containing polymer is chosen from among polymers or mixtures of polymers chosen from among homopolymer vinyl chlorides such as polyvinyl chloride, polyvinylidene chloride, chlorinated polyvinyl chloride, post-chlorinated polyvinyl chloride and copolymers formed by the polymerisation of a vinyl chloride monomer with up to 40% of a comonomer such as vinyl acetate, vinyl butyrate, vinylidene chloride, propylene, methyl methacrylate and the like, as well as chlorine-containing polymers containing other polymers such as chlorinated polyethylene, terpolymers of acrylonitrile, butadiene, styrene, terpolymers of methyl methacrylate, butadiene, styrene; polyacrylate resins, poly methyl methacrylate resins and terpolymer of alkyl acrylate, methyl methacrylate, butadiene, preferably the chlorine-containing polymer is polyvinyl chloride or post-chlorinated polyvinyl chloride.

Preferably the chlorine containing polymer is chosen from homo- and copolymers of vinyl chloride (VC); comprising at least 50 wt % of VC units, preferably at least 70 wt % of VC units, more preferably at least 80 wt % of VC units, advantageously at least 85 wt % of VC units; or mixtures thereof.

Preferably the copolymer of vinyl chloride comprises between 1 wt % and 30 wt % of vinyl acetate units, more preferably between 5 wt % and 20 wt % of vinyl acetate units, advantageously between 10 wt % and 15 wt % of vinyl acetate units.

The halogen containing polymer is in form of particles in an aqueous dispersion. The aqueous dispersion is either in form of a suspension or a latex. The difference between the suspension and the latex is the interval of the particle size.

The number average particle size of the suspension polymer is from 5 μm to 300 μm, preferably the number average particle size of the suspension polymer is from 50 μm to 250 μm and advantageously from 100 μm to 150 μm.

The number average particle size of the latex polymer (either unseeded emulsion latex or seeded emulsion latex) is from 0.01 μm to 5 μm and advantageously from 0.05 μm to 2 μm.

The number average particle size of the microsuspension polymer is from 0.2 μm to 10 μm and advantageously from 0.5 μm to 3 μm.

The halogen containing polymer is synthesised by suspension polymerization, micro-suspension polymerization or emulsion polymerization in aqueous phase Preferably the halogen containing polymer is a micro suspension grade PVC or an emulsion grade latex PVC.

More preferably the halogen containing polymer is a an emulsion grade latex PVC.

With regard to the mineral filler, mention may be made of glass fibers, hollow glass microspheres, inorganic compounds, such as minerals and salts including calcium carbonate ($CaCO_3$), silica, silicates such as calcium silicate or metasilicate, clay such as bentonite, mica, talc, alumina trihydrate, magnesium hydroxide, metal oxides, or combinations of two or more thereof.

Preferably the mineral filler is chosen from calcium carbonate, titanium dioxide or calcinated clay, silica (fumed or precipitated, clay, Montmorillonite (nano-clay), zeolite, perlite or any other type of inorganic material that can be obtained as a slurry.

Preferably the mineral filler is chosen from calcium carbonate, calcinated clay, silica (fumed or precipitated, clay, Montmorillonite (nano-clay), zeolite or perlite.

In a more preferred embodiment the mineral filler is calcium carbonate (CaCO3). The CaCO3 might contain up to 15 wt % and preferably up to 10 wt % and advantageously up to 5 wt % impurities.

Advantageously the calcium carbonate is chosen from precipitated calcium carbonate (PCC), grinded natural calcium carbonate (GCC) or nanosized particles of precipitated calcium carbonate (NPCC).

The mineral filler can be present in the polymer composite in an amount that is sufficient to improve the stiffness of halogen containing polymer and can be about from 0.1 wt % to about 90 wt %, preferably, about from 1 to about 50 wt %, or more preferably from about 2 to about 40 wt % and advantageously from 3 to 20 wt %, by weight of the resulting polymer composite comprising halogen containing polymer and mineral filler.

The preferred mineral filler calcium carbonate can be present in the polymer composite composition in an amount from 0.1 wt % to 90 wt %, preferably from 1 wt % to 79 wt %, or more preferably from 2 wt % to 70 wt % and advantageously from 3 to 60 wt %, and more advantageously from 4 to 49 wt %, by weight of the resulting polymer composite comprising halogen containing polymer and mineral filler. Preferably the halogen containing polymer is chosen from a homopolymer of vinyl chloride (VC) or copolymer of vinyl chloride comprising at least 50 wt % of VC units, preferably at least 70 wt % of VC units, more preferably at least 80 wt % of VC units, advantageously at least 85 wt % of VC units; or mixtures thereof.

Figure 2:
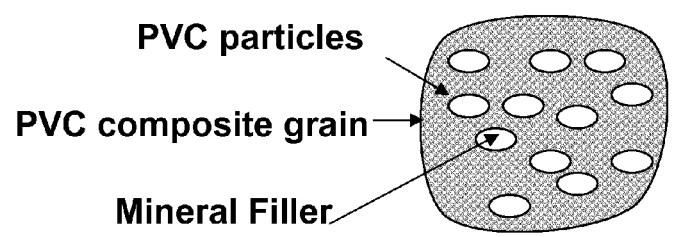

The halogen containing polymer comprises the mineral filler homogenously distributed. The halogen containing polymer is a continuous matrix comprising the mineral filler in form of particles (as shown in FIG. 1 and FIG. 2).

As regards the mineral filler, it has, according to the invention, hardness on the Mohs scale less than 7, preferably less than 6 and for example less than or equal to 4. A mineral filler having hardness on the Mohs scale more than 6 leads to abrasion of the tools and machines used for the processing of the composition containing the halogen polymer.

Particles of the mineral filler according to the invention have a diameter determined by any methods known by a person skilled in the art. Usually the mineral filler has a number average primary particle size less than 15 µm, preferably less than 10 µm and advantageously less than 2 µm.

As regards the slurry of the mineral filler, it is a water dispersion of a mineral filler with solid content preferably between 5 and 90% and advantageously between 50 and 80%. This water dispersion can contain any specific surfactant, dispersing agent, additive or filler surface treatment that can advantageously improve the quality of the slurry (stability, viscosity or compatibility with the host polymer matrix).

With regard to the manufacturing method for a polymer composite composition according to the present invention, it comprises the steps of
 a) mixing of at least one halogen containing polymer with at least one mineral filler
 b) drying the mixture of previous step
wherein the halogen containing polymer and the mineral filler in step a) are in form of a dispersion in aqueous phase.

Preferably the drying of the mixture of at least one halogen containing polymer with at least one mineral filler, is made by spray drying or freeze drying.

The halogen containing polymer and the mineral filler are the same as defined before.

With regard to a variation of the manufacturing method for a polymer composite composition according to the present invention, it comprises the steps of
 a) mixing of at least one halogen containing polymer with at least one mineral filler
 b) recovering of the mixture obtained in a)
 c) drying the recovered mixture of step b)
wherein the halogen containing polymer and the mineral filler in step a) are in form of a dispersion in aqueous phase.

By recovering is meant partial or complete separation between the aqueous and solid phase latter comprises the halogen containing polymer and the mineral filler. In the case that a complete separation between the aqueous and solid phase of the mixture takes already place during the recovering step, no further drying is necessary. Or in other words the recovering and the drying of the mixture take place at the same time.

Preferably the recovery of the mixture of at least one halogen containing polymer with at least one mineral filler, is made by spray drying, freeze drying or coagulation.

The halogen containing polymer and the mineral filler are the same as defined before.

Advantageously the recovery of the mixture of at least one halogen containing polymer with at least one mineral filler, is made by spray drying.

The polymer composite composition according to the present invention comprises less than 3 wt % humidity and preferably less than 1.5 wt % humidity and more preferably less than 1.2 wt % humidity.

In the case of spray drying it is possible to mix the dispersion of the halogen containing polymer and the slurry or dispersion mineral filler before adding the mixture to the spray drying apparatus. It is also possible to mix the dispersion of the halogen containing polymer and the slurry or dispersion mineral filler inside the spray drying apparatus during the recovering step.

Spray drying is the preferred method for the recovering and/or drying for the manufacturing method for a polymer composite composition according to the present invention.

The polymer composite composition according to the present invention is preferably in form of a powder, preferably a dry powder. By dry is meant that the powder has a certain maximum level of humidity.

The dry polymer composite composition in form of a powder according to the present invention comprises less than 3 wt % humidity and preferably less than 1.5 wt % humidity and more preferably less than 1.2 wt % humidity.

The weight medium particle size D50 of composite powder according to the invention is between 20 µm and 700 µm, preferably between and 30 µm and 600 µm and advantageously between 50 and 500 µm.

The apparent density or bulk density of the dry composite polymer powder at least 0.5 g/cm3, preferably at least 0.6 g/cm3 and more preferably 0.7 g/cm3.

The composite powder comprises a continuous matrix made up of the halogen containing polymer and particles of the mineral filler (as shown in FIG. 1 and FIG. 2).

The polymer composite comprising the halogen containing polymer and the mineral filler can be used for cladding and for the manufacture of profiles, pipes, or sidings or flooring films or flooring sheets.

The polymer composite comprising the halogen containing polymer and the mineral filler can be used as a masterbatch. By this is meant the polymer composite comprising the halogen containing polymer and the mineral filler is further blended. If used as a masterbatch, the polymer composite comprising the halogen containing polymer and the mineral filler is preferably blended with another polymer or polymers or mixture of polymers and/or additives.

Preferably the other polymer or at least one of the other polymers is also a halogen containing polymer.

Preferably the other additive is chosen from at least heat stabilizers, impact modifiers, processing aid, lubricants, titanium dioxide, pigments or calcium carbonate.

The halogen containing polymer may also contain other additives such as additional mineral fillers, organic or inorganic pigments, carbon blacks, carbon nanotubes, glass beads, glass fibers, flame retardants and or reinforcing agents.

The present invention relates also to an article comprising the polymer composite comprising the halogen containing polymer and the mineral filler as described above. This article can be a profile, a pipe, a siding, a flooring film or sheet.

[Methods of Evaluation]

Scanning Electronic Microscopy

The sample is observed by scanning electron microscopy (SEM) with retro diffusion mode in order to discriminate CaCO3 and PVC particles. CaCO3 particles appear as a white spots and PVC part as a grey continuous phase. The CaCO3 particles are seen inside the composite grain as small spots (see FIG. 1 and FIG. 2). The CaCO3 which is seen white in the SEM picture of FIG. 1 due to retro diffusion, is located inside the PVC composite particles. It can be concluded from these microscopy investigations that the calcium carbonate is fully encapsulated into the PVC powder particles. This will surely avoid any risk of segregation between PVC and CaCO3 during handling and pneumatic transportation.

For the estimation of weight average powder particle size, particle size distribution and ratio of fine particles a Malvern Mastersizer S apparatus with a 300 mm lenses, measuring a range from 0.5-880 µm is used. The D (v, 0.5) is the particle size at which 50% of the sample has size less then and 50% of the sample have a size larger then that size, or in other words the equivalent volume diameter at 50% cumulative volume. This size is also known as volume medium diameter (abbreviated D50) that is related to the mass or weight median diameter by the density of the particles assuming a size independent density for the particles.

The apparent density or bulk density of the powder is measured freely settled by pouring the powder in a cylinder of known volume and mass. The top of the cylinder is straightened with an edge in order to scrape off excess powder. The cylinder is weigh with a balance and the apparent density is calculated as mass of the powder divided by the volume of the cylinder.

EXAMPLES

The PVC latex is prepared according to the technique described in different patents (for example RO82408, DD275376, JP2003160610) which employs a standard emulsion polymerization technology. From the DD275376 patent, the continuous emulsion polymerisation of vinyl chloride monomer with the addition of an emulsifier solution containing Na diisodecyl sulfosuccinate 11.9, Na alkanesulfonate 2.1, and $Na_5P_3O_{10}$ 0.34 g/kg gave a latex of PVC with a solids content of 44.3%.

The $CaCO_3$ slurry is prepared according to the technique described in J.P. Pat. No. 59057913. Namely the slurry is obtained by mixing 270 parts of water, 0.72 parts of sodium polyacrylate and 729.3 parts of $CaCO_3$ of diam. 0.2-0.6 microns and 0.6% moisture and stirring for 20 min at shear rate 5. times. 102/s.

The latex and the slurry are mixed with the following ratio, 19.2 kg (19.2 parts) of latex and 2.2 kg (2.2 parts) of slurry, and spray dried in the conditions classically used for the latex alone. The obtained powder has a particle size ~100 μm.

The volume medium diameter D50=63 μm and bulk density of the dried powder is 0.76 g/cm3.

The composite PVC resin composition obtained is characterized by Scanning Electron microscopy (SEM) as shown in FIG. 1.

FIGURES

FIG. 1:
Scanning Electron Microscopy picture of CaCO3 containing PVC composite according to example 1

FIG. 2:
Schematic representation of the composite composition of the invention according to FIG. 1 exemplifying example 1. Mineral filler (white spots/circles) are dispersed inside a PCV composite composition in form of a powder grain which comprises the agglomerated particles of the initial PVC latex.

The invention claimed is:

1. A method for manufacturing a polymer composite composition which is a dry powder comprising less than 3 wt % humidity, having a bulk density of at least 0.7 $g/cm^3$ and having a weight medium particle size D50 of between 30 microns and 600 microns, said method comprising the steps of:
   a) mixing of at least one halogen containing polymer wherein the halogen is chlorine and wherein the halogen containing polymer is a homo- or copolymer of vinylchloride, comprising at least 50 wt % of vinylchloride units, with at least one mineral filler which is calcium carbonate wherein the mineral filler presents from 0.1 wt % to about 90 wt % of the polymer composite comprising halogen containing polymer and mineral filler,
   b) recovering of the mixture obtained in a) by spray drying, freeze drying, or coagulation,
   c) drying the recovered mixture of step b)
   wherein the halogen containing polymer and the mineral filler during mixing step a) are in form of a dispersion in aqueous phase.

2. The method according to claim 1, wherein the recuperation of step b) is made by spray drying.

* * * * *